US005613206A

United States Patent [19]
Bantz et al.

[11] Patent Number: 5,613,206
[45] Date of Patent: Mar. 18, 1997

[54] AD HOC PACKET DATA NETWORKS USING CELLULAR TELEPHONE NETWORKS

[75] Inventors: David F. Bantz, Chappaqua; Anand Narasimhan, New York, both of N.Y.

[73] Assignee: International Business Machines Corporation, Armonk, N.Y.

[21] Appl. No.: 417,570

[22] Filed: Apr. 6, 1995

[51] Int. Cl.[6] .................................................. H04Q 7/14
[52] U.S. Cl. ...................... 455/34.1; 455/54.1; 455/58.2; 379/59
[58] Field of Search .................................. 455/33.1, 33.4, 455/34.1, 34.2, 53.1, 54.1, 56.1, 58.2, 54.2, 62, 63; 379/59; 375/358; 371/33.1

[56] References Cited

U.S. PATENT DOCUMENTS 5,515,366   5/1996   Chieu et al. ............................... 370/50

*Primary Examiner*—Reinhard J. Eisenzopf
*Assistant Examiner*—Darnell R. Armstrong
*Attorney, Agent, or Firm*—Douglas W. Cameron

[57] ABSTRACT

This invention discloses a method and apparatus for acquiring and maintaining a cellular wireless communications subnetwork on an Ad Hoc basis, where mobile units within a cellular network communicate with each other using only a single communications channel of the entire cellular wireless communications network.

9 Claims, 5 Drawing Sheets

AD HOC PACKET DATA NETWORKS USING CELLULAR TELEPHONE NETWORKS

TECHNICAL FIELD

This invention relates to a method and apparatus for acquiring and sharing a single radio channel in a mobile communications network.

DESCRIPTION OF THE PRIOR ART

In radio cellular telephone networks in general, and in the US North American advanced mobile telephone system (AMPS) in particular, it is the case that a single cell base manages the use of the radio spectrum for a particular geographic area, and provides wireless-to-wired bridging between a radio network and a terrestrial landline network. The spectrum is divided into channels, one or more of which are dedicated to control and signalling functions. With reference to FIG. 1, a cell base is shown with several telephones (mobile phones 16 and 18) in its service area. The dotted lines 3 in the figure show that the logical connectivity (the flow of spoken information) is between the cell base 1 and each telephone 16 and 18. There is no logical connectivity directly between the telephones.

In order to establish a connection with the cell base, a mobile phone first scans to find which channel is currently in use by the cell base for control and signalling purposes. It then waits and signals its presence in the cell, and that it desires to originate a call. The cell base responds by placing the call through its attachment to the landline network 6, and reserves a channel for use by the mobile phone. Actually, since in AMPS a channel is needed for transmission to the cell base (the "uplink" channel) and an additional channel is needed simultaneously for transmission from the cell base to the mobile phone (the "downlink" channel), a channel pair is allocated. Once the call is completed through the landline network, the mobile phone is free to use the channel pair for the call.

SUMMARY OF THE INVENTION

It is an object of this invention to use existing, and unmodified facilities of the AMPS cellular telephone network or similar networks to support wireless data communication between data communication terminals within the coverage area of a cell base.

With this invention, a wireless subnetwork of notebook computers, for example, in a cell base can acquire and maintain exclusive use of a channel pair for wireless communication among themselves.

Accordingly, this invention provides a method and apparatus for sharing a single radio channel among a plurality of mobile units in cellular network. With this invention, a request signal is transmitted from a selected one of the mobile units to the base station, where the request signal indicates a request to use a radio channel. In response to the request signal, a radio channel is assigned to the selected mobile unit for use by the mobile unit. The selected mobile unit then transmits idle signals over the radio channel to indicate its use of the radio channel. The selected unit also transmits advertisement signals to other mobile units indicating that the other mobile units may request use of the channel. When one of the other mobile units desires to use the radio channel, the other mobile unit will transmit a second request to the selected mobile unit indicating a request to use tile channel. The selected mobile unit will then transmit a response to the latter request indicating that the requesting other mobile unit may use the radio channel. When the requesting other mobile unit receives the latter response from tile selected mobile unit, it will then proceed to use the channel. Upon cessation of use of the channel by the requesting mobile unit, the selected mobile unit will resume transmission of the idle signal to indicate to the cell base that the radio channel is still being used.

DESCRIPTION OF THE PREFERRED EMBODIMENT

Figure 1:
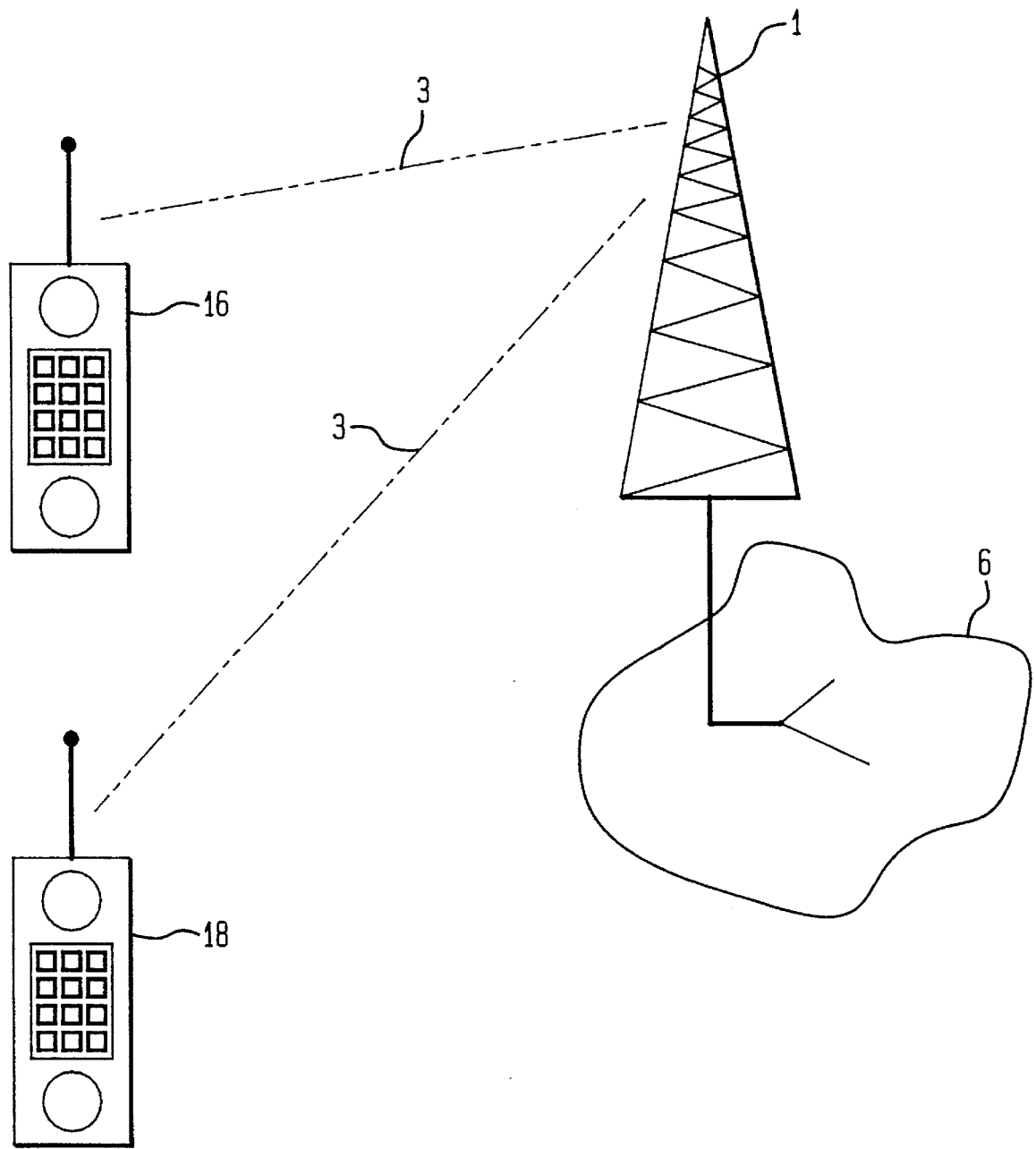
FIG. 1 schematically illustrates a wireless cellular network connected to a landline network.
Figure 2:
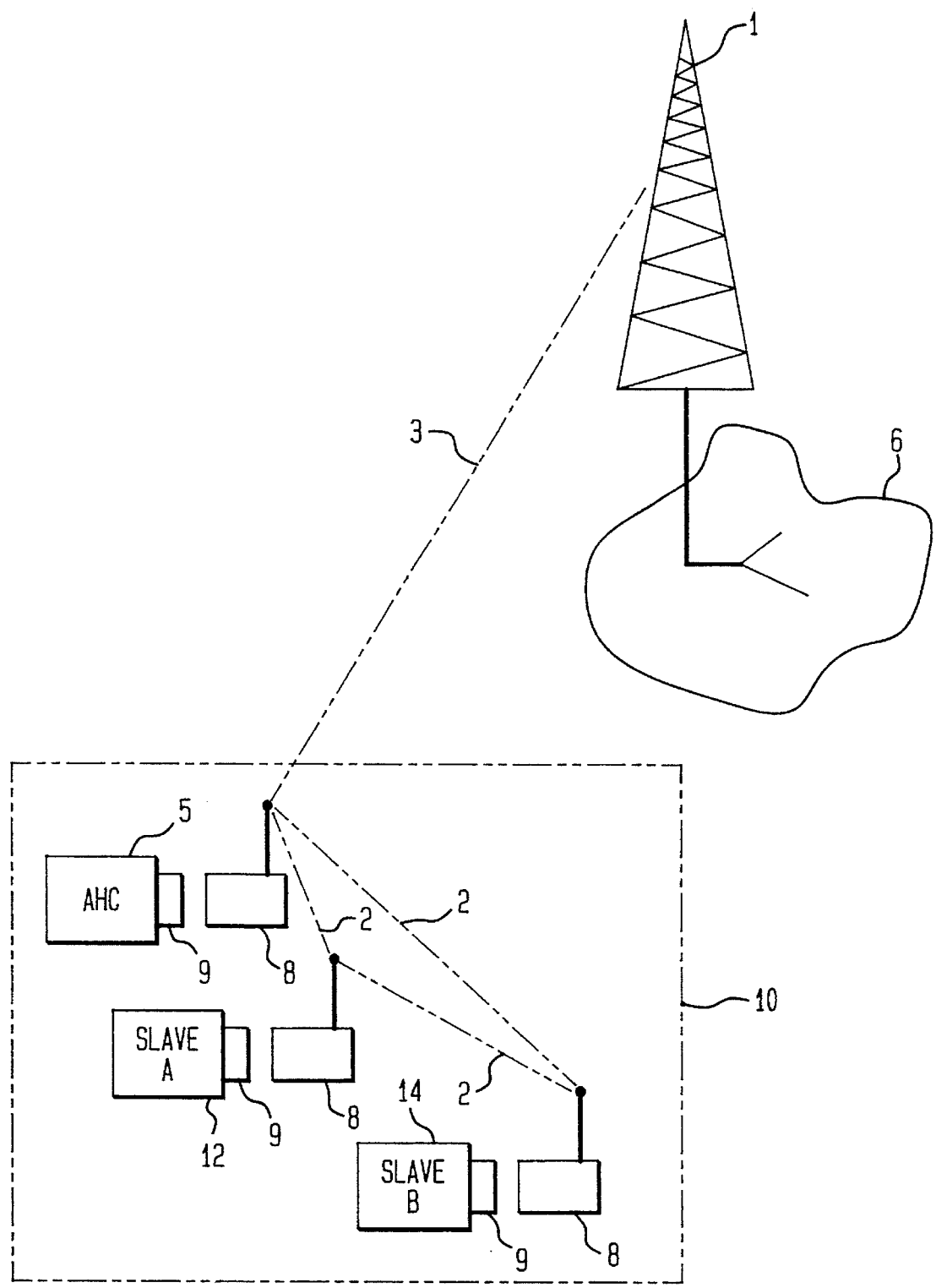
FIG. 2 schematically illustrates a wireless subnetwork in communication with a base station.

Shown in FIG. 2 are three notebook computers 5, 12 and 14 equipped with radios capable of communicating with cell base 1 and with each other using channels allocated by the base station. In the example subnetwork 10 shown in FIG. 2, computer 5 acts as a Ad Hoc Controller (AHC) while computers 12 and 14 are the slaves. The AHC is distinguished from a slave only in the computer program that it runs. The method by which a wireless subnetwork is established and maintained will now be described by reference to the flowchart of FIG. 3, which describes the function of the AHC. This logical flow has three segments: initiation, management, and termination. The notebook computers are capable of being adapted to wireless data communication through the incorporation of a generic adapter interface, which could be a PCMCIA (Personal Computer Memory Card Industry Association) adapter card containing control logic and a radio compatible with the AMPS system. If the adapter card is to be used for telephone communications as well as wireless data communications, additional connections must be made to the card to accommodate a telephone handset. In any case, an antenna must be provided to receive and radiate the radio signals. The antenna may be contained on the adapter card or may be connected to the adapter through an extension of the adapter interface or through a separate cable.

Of course, the form of the device participating in the wireless subnetwork need not be precisely as shown. The device and its radio may be combined into a single unit, and the device need not be a notebook computer. The combination of the device and radio must be capable of implementing the method of the invention. The preferable means of implementing the invention is as a computer program.

The invention will be described as the interaction of a computer program with the functions and facilities of the adapter card 8. The implementation of these functions and facilities will be familiar to those skilled in the art, and are not further described here. In general, the adapter implements the functions of a cellular telephone: it scans for a control channel, registers itself with the cell base, and awaits either incoming or outgoing call requests. In addition to telephone function, it is also capable of transmitting and receiving digital data, either through a modem, which generates audible tones of controlled frequency, amplitude and phase by which the digital data is conveyed, or directly through some form of digital modulation of the radio frequency carrier.

Figure 3:
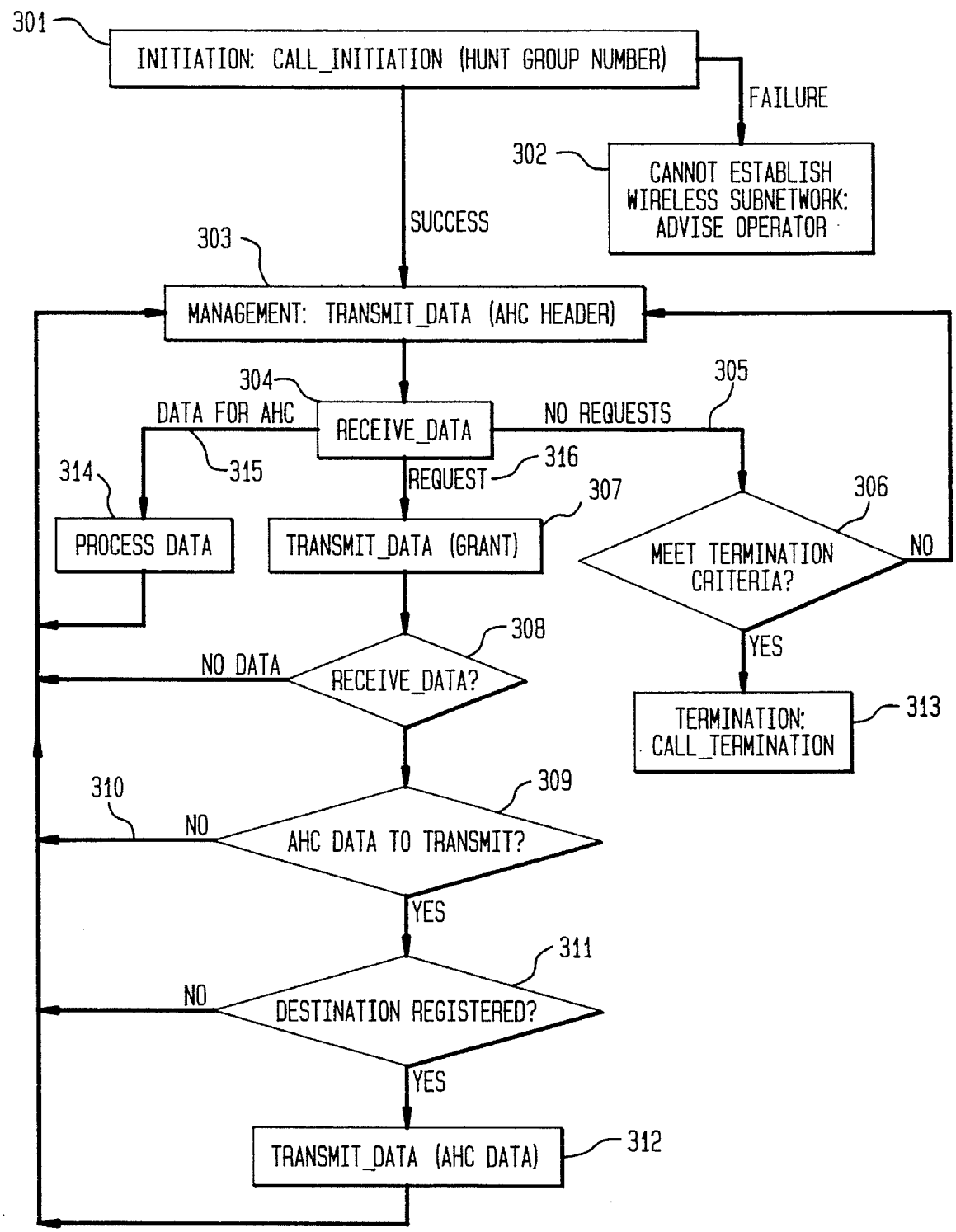
FIG. 3 schematically illustrates the flowchart for establishing and maintaining a wireless subnetwork according to the invention.

The invention is embodied in a computer program, which may be in the notebook computer, in a control processor in the adapter card, or may be partitioned between the two. In a preferred implementation, the program of FIG. 3 is in a control processor. Overall control would be provided by the notebook computer in the form of initiating or terminating the AHC function. But alternatively, the entire program could be run in the notebook computer.

The facilities of the adapter card include the RF transceiver, the modem (if using audible tones to transmit data) or a digital modulator and demodulator (if using direct digital modulation of the RF carrier). There is a control processor on the adapter card capable of implementing the specific functions listed below.

If the adapter card is designed as a PCMCIA cellular telephone with a modem, it must be modified to provide packet service. Existing cellular modems are designed to operate in a point-to-point mode with a continuous connection between endpoints. In this application, the modem must switch on and off so that the channel can be released to another mobile unit, to share the channel. It must also be possible to direct a slave to listen on a specific channel. This adapter cord is generically a cellular telephone, but in those devices the scanning for a control channel is automatic. The invention requires that the cellular transceiver be capable of listening on a specific channel for an AHC header message.

The specific functions required of the adapter card are:

1. $call_{13}$ initiation: given the telephone number of a called party, emulate the function of a cellular telephone in placing a call through the cell base.
2. $call_{13}$ termination: emulate the function of a cellular telephone in terminating a call through the cell base.
3. $transmit_{13}$ data: given a digital sequence from the computer, transmit the sequence on the assigned channel, or on a channel chosen by the computer.
4. $receive_{13}$ data: convert signals on the assigned channel (or on a channel chosen by the computer) to a digital sequence, and supply that sequence to the computer.

Transmission and reception of data may be simultaneous or alternate, depending on whether both of the channel pairs are used, or just one. If the means by which the adapter card transmits digital data are through audible tones which can be accurately reproduced on the downlink channel by the cell base, then transmission and reception can be simultaneous. If digital modulation is used, which cannot be accurately reproduced on the downlink channel by the cell base, then only the uplink channel can be used and data transmission and reception must be done alternately.

As shown in FIG. 2, the notebooks participating in the wireless subnetwork are of two types: a unique instance, called the "Ad Hoc Controller," or AHC, and one or more slave instances. The AHC is distinguished from a slave only in the computer program that is runs. The method by which a wireless subnetwork is established and maintained will now be described by reference to the flowchart of FIG. 3, which describes the function of the AHC. This logical flow has three segments: initiation, management, and termination.

As the AHC and slaves can all function as cellular telephones, wireless network initiation can be accomplished by having the AHC monitor for an incoming call. A slave wishing to use the facilities of the wireless subnetwork then places a conventional telephone call to the AHC. When the AHC answers, the slave sends digital data to the AHC informing it of the need to establish a wireless subnetwork. The slave then terminates the call, and the AHC establishes a wireless subnetwork using the method of FIG. 3. Similarly, if each slave sends a message to the AHC indicating that it has no further need for the wireless subnetwork before ceasing its use of the subnetwork, the AHC can de-register the slave. Upon de-registration of the last slave, the AHC can cease its transmission of AHC headers and can terminate its call. Referring to FIG. 3, initiation 301 of a wireless subnetwork can be invoked at any time by the operator of the AHC device, or at a certain time of day, or periodically, or by other criteria such as, for example, because it has data to transmit. Initiation consists of invoking the call initiation function of the adapter with a known telephone number. This telephone number is preferably local, and is answered automatically with no audible response. A group of lines, known in the telephone industry as an "hunt group," is preferable, allowing multiple AHCs in different cells to initiate their calls with the same telephone number. The implementation of automatic answering equipment is known to those skilled in the art.

Alternatively, an arrangement can be made with the provider of cellular telephone services to provide a special number or sequence for the AHC to call. Since the intent of the call is merely to reserve a channel in the cell for the transmission of digital data among the members of the wireless subnetwork, no actual call need be placed.

If the attempt to initiate a call fails for whatever reason, the wireless subnetwork cannot be initiated 302. Transmission and reception by the AHC subsequent to initiation uses the channel pair allocated by the cell base.

Management of the wireless subnetwork by the AHC consists of identifying the AHC via transmission of AHC header messages 303, soliciting requests to transmit from a slave station. The AHC then pauses briefly to receive transmissions 304 from one or more slave stations containing control requests to the AHC, or to transmit data to the other slaves. If no requests are received 305, and if the termination criteria has not been met 306, the AHC transmits an AHC header message again 303. If requests are received from the slaves, the AHC acknowledges the request with a grant message 307 to a specific slave and awaits the transmission from the specific slave 308. If the transmission does not commence within a brief interval, the AHC assumes that no slave has data and recommences AHC header transmission. If the slave transmission does commence, the AHC waits for the transmission to complete and then recommences AHC header transmission 303.

It is incumbent on the AHC to ensure that the channel pair that has been allocated by the cell base is nearly always being used. The uplink will be used every time the AHC transmits: it may not be used during the interval just after the transmission of the AHC header when requests are solicited from slaves, and it may not be used during the time allocated for slave data transmission, even if the slave does not use this time. For this reason, in steps 304 and 308 of FIG. 3, the AHC limits the duration of possible lack of transmission. In step 304, the limit is explicit in that all slaves must transmit within a specific, short interval. In step 308, the limit is implicit in that all slaves must commence transmission soon after the AHC acknowledgement, and the AHC commences transmission on the uplink after the slave transmission ceases.

If in 304 a transmission is received directed to the AHC 315, the AHC then processes the data contained in this transmission 314 and again transmits an AHC header message 303. The AHC can determine whether a transmission is directed to it based on information contained within the transmission, called a "destination address" in the art. The processing performed in the AHC 314 responsive to the receipt of data 315 is specific to the application of this system, and is beyond the scope of this invention.

If in step 304 a request 316 is received from a slave station, the AHC transmits a grant 307 to that station and awaits the transmission 308 from the station. The transmission may be from a slave station to another slave station, or may be to the AHC itself. If in step 309 the AtlC finds that the transmission from the slave station was directed to the AHC and that a response is required 309, then the AHC must check 311 that the slave station is registered to receive data from the AHC. If it is, then the response can be transmitted 312.

In the case that the AItC has data to send to a particular slave, that data can be contained in the AHC header itself and transmitted in step 303. Alternatively, the AHC can use some protocol to ensure that the slave is ready to receive this data. For example, the AHC can transmit a message in the AHC header in step 303 soliciting a request from the slave to receive data. This request would be received in some subsequent cycle in step 308. If no requests are received from slaves 305 and if the termination criteria 306 are met, then the AHC invokes the call termination function of the adapter 313.

Termination of the wireless subnetwork occurs either because of an explicit command from the AHC computer, or because there have been no requests from slaves for a predetermined period of time, or for other reasons, such as a charges for the current call exceeding some preset limit. The AHC terminates the subnetwork by invoking the call termination function of its adapter. This function will always succeed.

Figure 4:
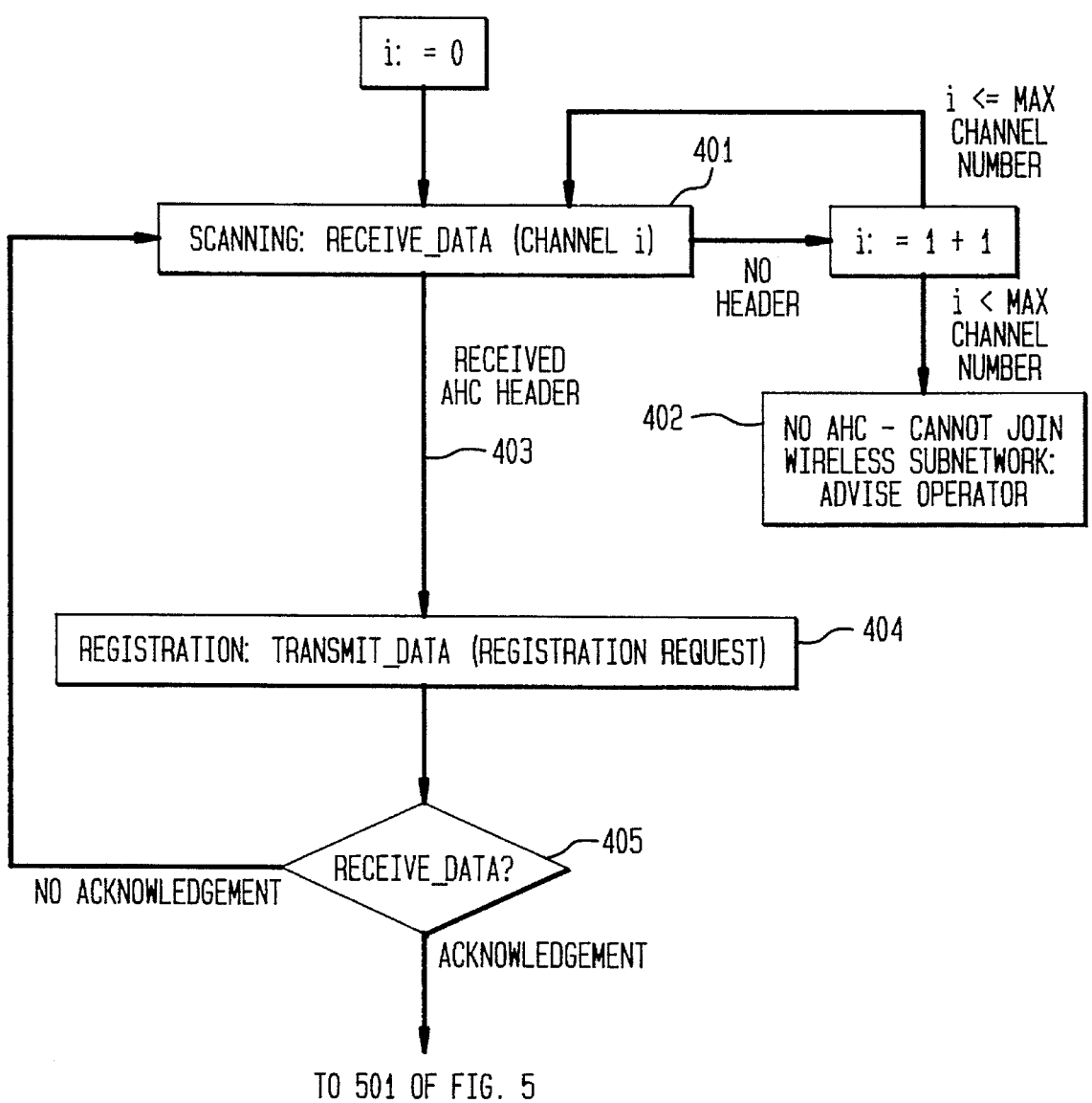
FIG. 4 is a flowchart schematically illustrating the scanning and registration procedures followed by the slave devices.
Figure 5:
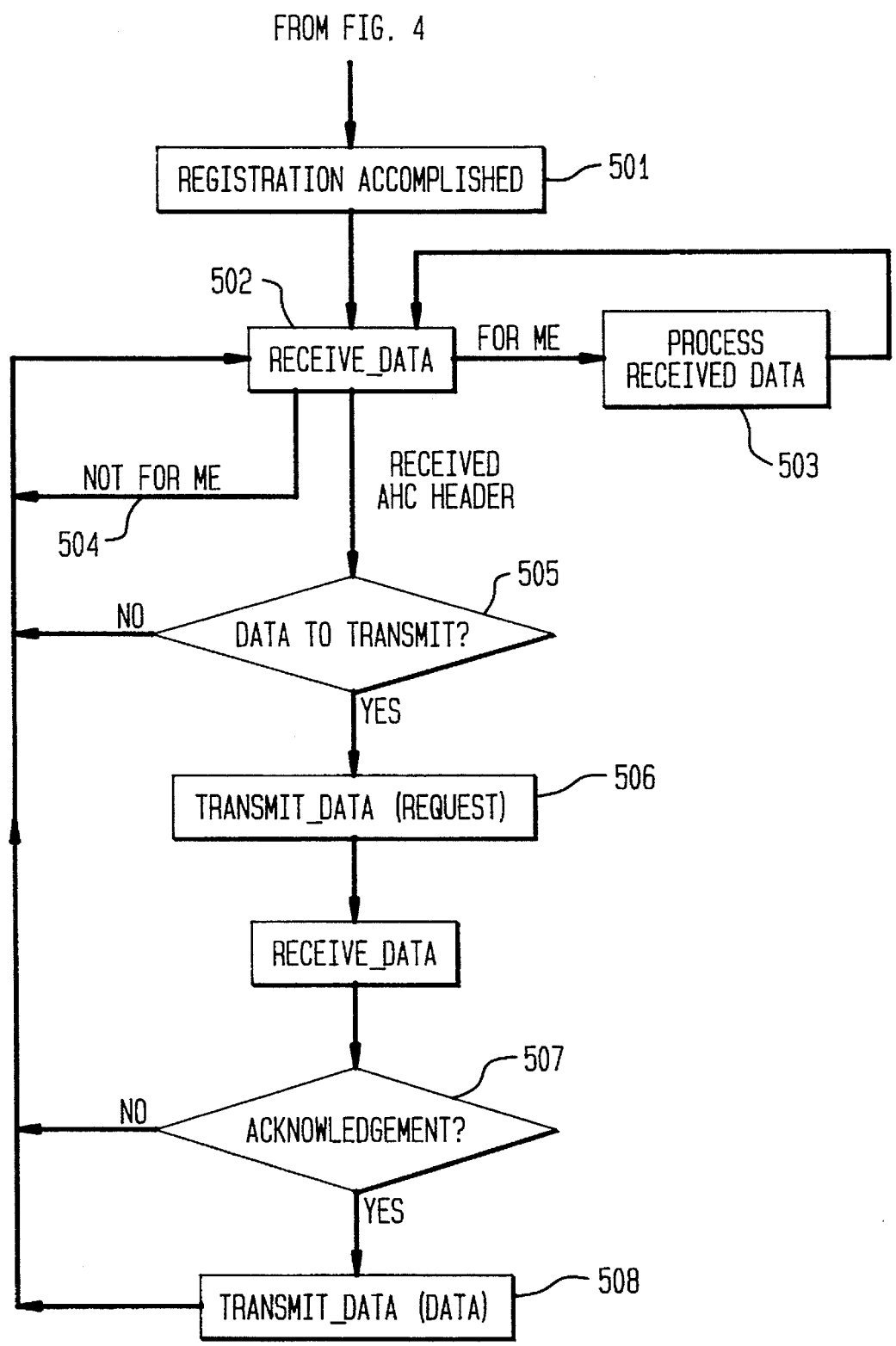
FIG. 5 schematically illustrates the flowchart for the transmission and reception of data by the slave devices following registration.

FIGS. 4 and 5 show the function of a slave device. FIG. 4 shows the first phases of its function, including scanning and registration. FIG. 5 shows its function in data transmission and reception.

Initiation of the slave device can occur at the action of its operator, or periodically, or at some other criteria, say because the device has accumulated data for transmission. Once initiated, the slave device scans channels in the cell to hear an AHC header 401. The slave listens on a given channel for a period of time that is known to be greatly in excess of the interval between AHC header transmissions. If no AHC header is heard on any channel, the slave cannot join a wireless subnetwork in progress 402 because there isn't any in that cell. The slave may choose at this time to initiate a wireless subnetwork by becoming an AHC. See the initiation process described in FIG. 3.

If an AHC header is heard 403, the slave initiates transmission of a registration request to the AHC subsequent to the receipt of the header 404. It then waits for an acknowledgement from the AHC 405. If the acknowledgement is not received, say because another slave transmitted at the same time, it then waits for another AHC header and retries its registration 401. This general principle of retry applies also to the transmission of request messages to the AHC as in FIG. 5.

Randomization techniques may be applied to the retries: for example, each time a retry fails, the slave station may draw a random number R and then wait until it has heard R AHC headers before attempting its retry. If a modem is used for the transmission of digital data using audible tones, transmission and reception can be simultaneous. This permits a slave to detect simultaneous transmissions immediately and defer, increasing the probability that one of the transmissions will get through, and permitting more efficient means of sharing the channel. Such techniques are well-known to those skilled in the art of data communication. Once the AHC acknowledgement has been received, the slave is registered. FIG. 5 shows the slave function for data transmission and reception. Once registered 501, the slave receives data 502 and determines its type. If the data is destined for the slave, it processes the data 503. It may be the case that the data requires acknowledgement, but this is the function of some higher-level protocol and is beyond the scope of the current description. The mechanism permitting such acknowledgement is present, in that the slave may transmit data. If the data is not destined for the slave 504, it continues monitoring for data 502. If the slave has data to transmit 505, it first waits for the AHC header, soliciting transmission requests and then sends its request 506. If tile request is acknowledged by the AHC 507, it sends its data 508.

Having thus described our invention, what we claim as new and desire to secure by Letters Patents is:

1. In a cellular network having a plurality of mobile units communicating with a fixed base station, a method sharing a single radio channel among said mobile units, said method comprising:

a) transmitting a first request signal from a selected one of said mobile units to said base station, said request signal indicating a request to use a radio channel;

b) assigning, in response to said first request signal, said radio channel to said selected mobile unit for use by said selected mobile unit;

c) transmitting an idle signal from said selected mobile unit over said radio channel to indicate use of said radio channel by said selected mobile unit;

d) transmitting an advertisement signal to other of said mobile units indicating that said other mobile units may request use of said radio channel;

e) transmitting a second request signal from at least one requesting one of said other mobile units to said selected mobile unit, said second request signal indicating a request to use said radio channel;

f) transmitting a response from said selected mobile unit to said requesting one mobile unit indicating that said requesting mobile unit may use said radio channel, wherein said requesting one mobile unit then uses said radio channel; and g) upon cessation of the use of said radio channel by said requesting mobile unit, resumption by said selected mobile unit of transmission of said idle signal.

2. A method as recited in claim 1 wherein steps a) through g) are started in response to one of said other mobile units placing a cellular telephone call to said selected mobile unit.

3. A method as recited in claim 1 wherein steps a) through g) are started daily at scheduled time of day.

4. A method as recited in claim 1, further comprising:
invoking a call termination function so as to terminate use of said radio channel when a selected limit on charges for a cellular call using said channel is reached.

5. A method as recited in claim 1, further comprising:
invoking a call termination function so as to terminate use of said radio channel when all of said other mobile units deregister with said selected mobile unit.

6. A method as recited in claim 1 wherein said mobile units communicate over said channel using modems.

7. A method as recited in claim 1 wherein said mobile units communicate over said channel using digital modulation of a radio carrier frequency.

8. In a cellular network having a plurality of mobile units communicating with a fixed base station, a method sharing a single radio channel among said mobile units, said method comprising:

a) transmitting a first request signal from a selected one of said mobile units to said base station, said request signal indicating a request to place a cellular telephone call;

b) assigning, in response to said first request signal, said radio channel to said selected mobile unit for use by said selected mobile unit;

c) transmitting an idle signal from said selected mobile unit over said radio channel to indicate use of said radio channel by said selected mobile unit;

d) transmitting an advertisement signal to other of said mobile units indicating that said other mobile units may request use of said radio channel;

e) transmitting a second request signal from at least one requesting one of said other mobile units to said selected mobile unit, said second request signal indicating a request to use said radio channel;

f) transmitting a response from said selected mobile unit to said requesting one mobile unit indicating that said requesting mobile unit may use said radio channel, wherein said requesting one mobile unit then uses said radio channel; and g) upon cessation of the use of said radio channel by said requesting mobile unit, resumption by said selected mobile unit of transmission of said idle signal.

9. In a cellular network having a plurality of mobile units communicating with a fixed base station, an apparatus for sharing a single radio channel among said mobile units, said apparatus comprising:

a) means for transmitting a request signal from a selected one of said mobile units to said base station, said request signal indicating a request to use a radio channel;

b) means for assigning, in response to said request signal, said radio channel to said selected mobile unit for use by said selected mobile unit;

c) means for transmitting an idle signal from said selected mobile unit over said radio channel to indicate use of said radio channel by said selected mobile unit; d) means for transmitting an advertisement signal to other of said mobile units indicating that said other mobile units may request use of said radio channel;

e) means for transmitting a second request signal from at least one requesting one of said other mobile units to said selected mobile unit, said second request signal indicating a request to use said radio channel;

f) means for transmitting a response from said selected mobile unit to said requesting one mobile unit indicating that said requesting mobile unit may use said radio channel, wherein said requesting one mobile unit then uses said radio channel; and g) means for upon cessation of the use of said radio channel by said requesting mobile unit, resumption by said selected mobile unit of transmission of said idle signal.

* * * * *